United States Patent [19]

Benson et al.

[11] Patent Number: 5,137,740
[45] Date of Patent: Aug. 11, 1992

[54] CONTINUOUS FOOD PROCESSING METHOD

[75] Inventors: Clark K. Benson, Millbrae; Andrew A. Caridis, Foster City; Lawrence F. Klein, Hillsborough, all of Calif.

[73] Assignee: Heat and Control, Inc., South San Francisco, Calif.

[21] Appl. No.: 758,295

[22] Filed: Aug. 28, 1991

Related U.S. Application Data

[60] Continuation of Ser. No. 526,122, May 21, 1990, abandoned, which is a division of Ser. No. 269,514, Nov. 10, 1988, Pat. No. 4,942,808, which is a continuation-in-part of Ser. No. 147,808, Jan. 25, 1988, abandoned, which is a division of Ser. No. 921,289, Oct. 20, 1986, Pat. No. 4,738,193, which is a continuation-in-part of Ser. No. 698,097, Feb. 4, 1985, abandoned.

[51] Int. Cl.⁵ .................................... A23L 1/01
[52] U.S. Cl. ........................................ 426/438
[58] Field of Search ............. 426/438, 439, 440, 441; 99/404, 407

[56] References Cited

U.S. PATENT DOCUMENTS

| | | | |
|---|---|---|---|
| 3,812,775 | 5/1974 | Sijbring et al. | 426/438 X |
| 3,885,056 | 5/1975 | Smith et al. | 426/441 |
| 4,020,189 | 4/1977 | Wright et al. | 426/438 |
| 4,269,861 | 5/1981 | Caridis et al. | 426/438 |
| 4,741,912 | 5/1988 | Katz et al. | 426/438 |
| 4,844,930 | 7/1989 | Mottur et al. | 426/438 |
| 4,863,750 | 9/1989 | Pawlak et al. | 426/438 |
| 4,923,705 | 5/1990 | Mottur et al. | 426/438 |

FOREIGN PATENT DOCUMENTS 2170396 8/1986 United Kingdom ............... 426/438

*Primary Examiner*—Arthur L. Corbin
*Attorney, Agent, or Firm*—Flehr, Hohbach, Test, Albritton & Herbert

[57] ABSTRACT

Cooking process is provided for cooking food products in a continuous manner whereby the moisture formed during the process of cooking is removed from the cooking oil and the time-temperature profile within the cooker along the cooking path may be adapted to substantially conform to a linear or non-linear curve. The apparatus provides a novel process the cooking process results in specialty snack foods having harder bite and/or lowered oil content.

9 Claims, 12 Drawing Sheets

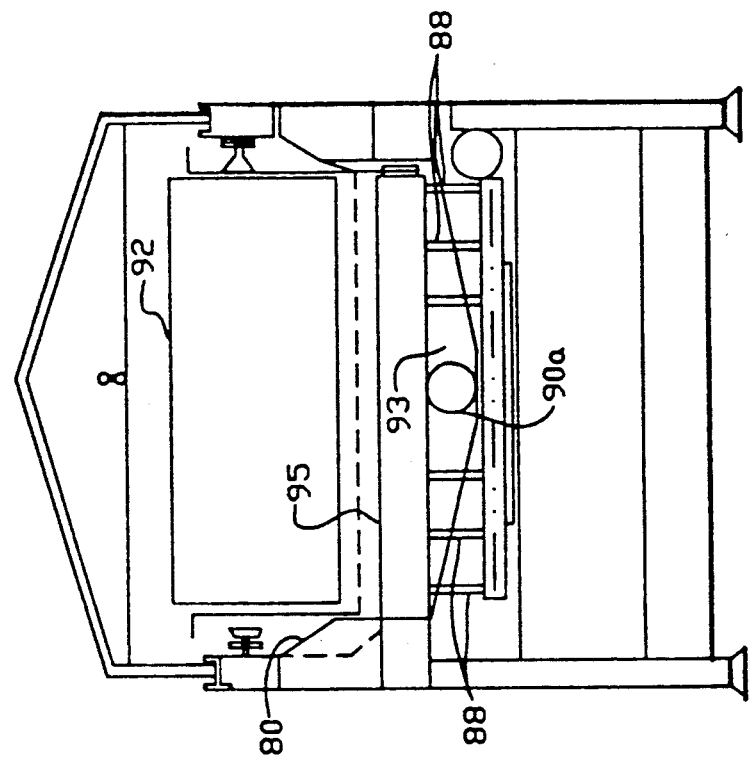
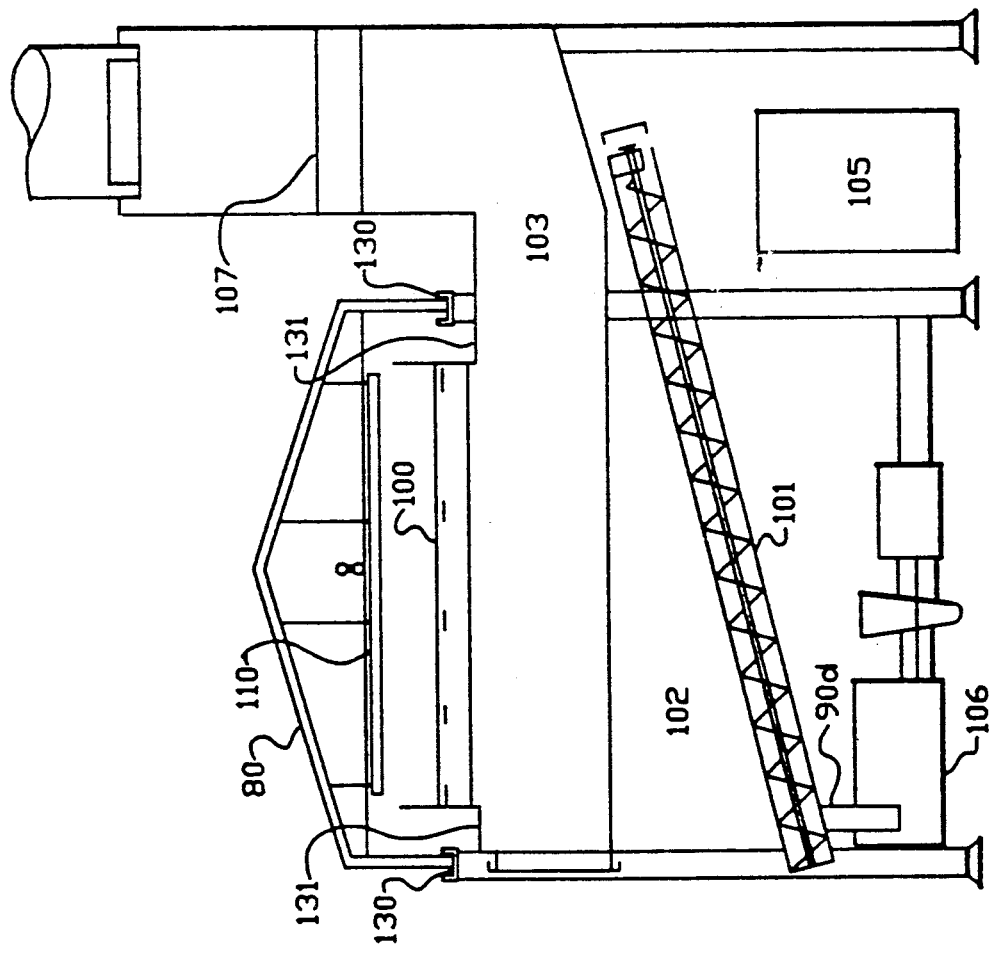

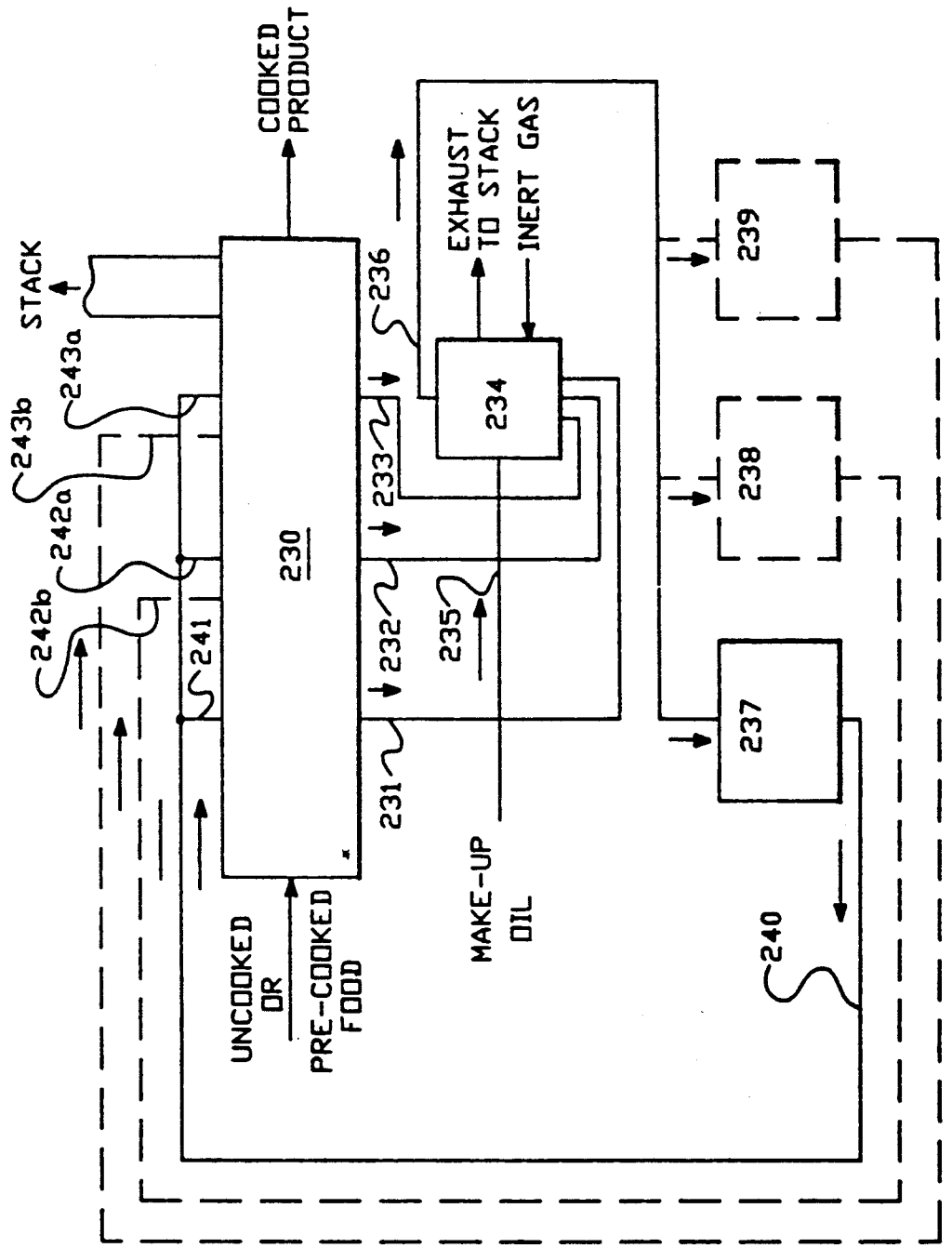

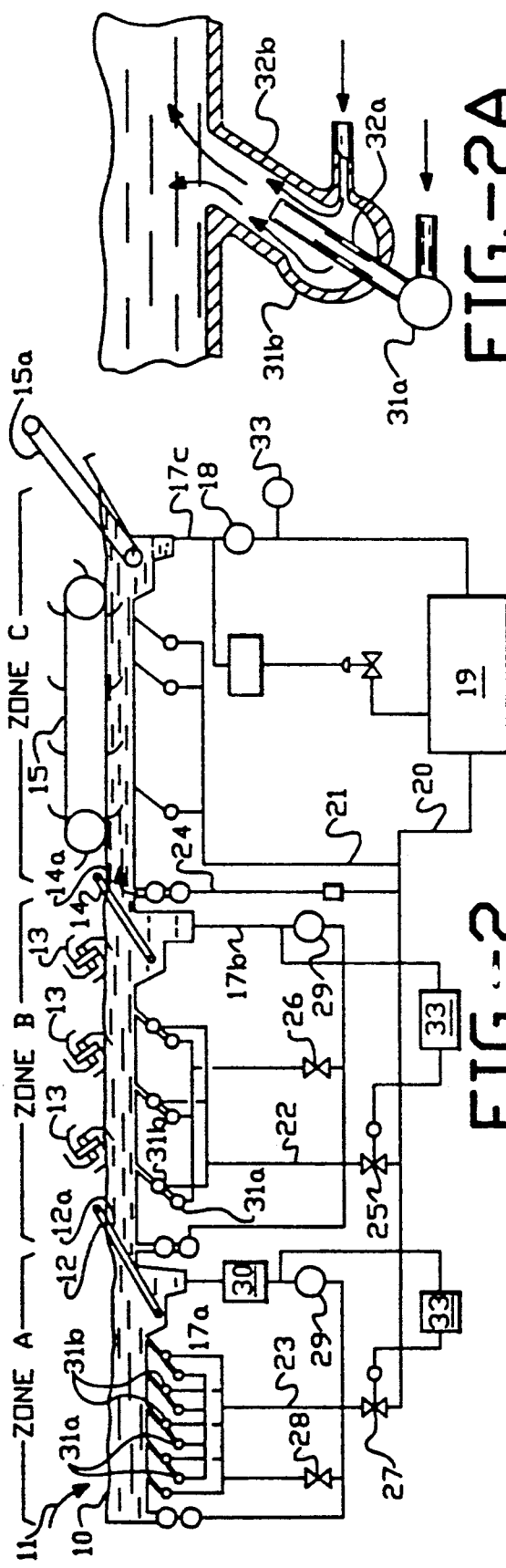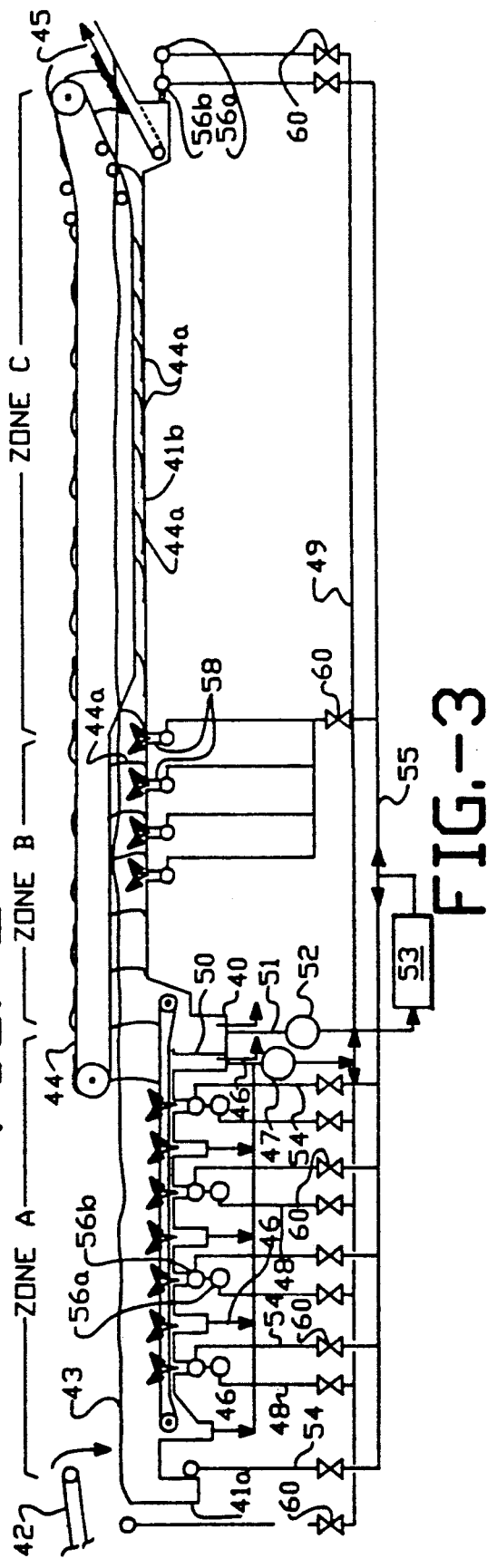

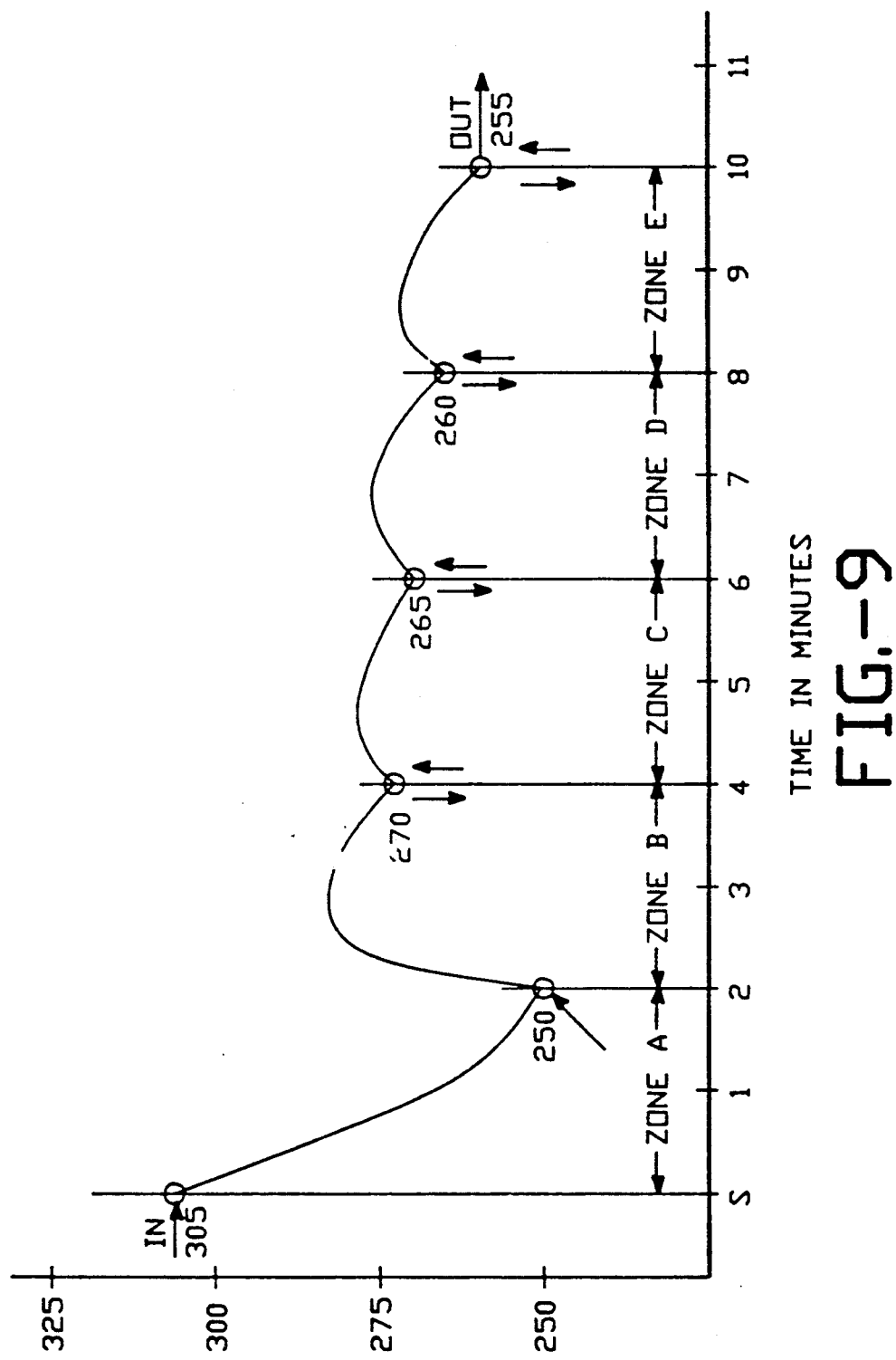

CONTINUOUS FOOD PROCESSING METHOD

This is a continuation of copending Ser. No. 07/526,122, filed May 21, 1990, now abandoned which, in turn, is a division of copending Ser. No. 07/269,514, filed Nov. 10, 1988, now U.S. Pat. No. 4,942,808, which, in turn, is a continuation-in-part of Ser. No. 07/147,808, filed Jan. 25, 1988, now abandoned, which, in turn is a division of Ser. No. 06/921,289, filed Oct. 20, 1986, now issued U.S. Pat. No. 4,738,193, which in turn is a continuation-in-part of Ser. No. 06/698,097, filed Feb. 4, 1985, now abandoned.

The present invention relates to the field of food processing and, in particular, to the process of deep frying food snack items.

BACKGROUND OF THE INVENTION

Methods used for deep frying foods on an industrial scale, particularly snack foods such as potato chips, corn chips, tortilla chips, banana chips and other types of chips or pellets, include batch processing and continuous processing. A batch process, for example, to prepare potato chips involves cooking a batch of either washed or unwashed potato slices in a cooker containing a cooking medium, such as, hot oil, then removing the entire batch from the oil for further processing, such as de-oiling, seasoning and so forth. The cooking medium may be oil, lard or other conventional materials. For convenience, hereinafter, the cooking medium will be referred to as oil and the snack food as potato chips, but it is understood that any conventional cooking medium may be utilized and any type of cooked chip may be processed according to the invention.

Continuous processing, of potato chips, for example, usually involves conveying the potato slices through a cooker containing hot oil such that the length of time the potato slices are in the oil and the oil temperature are appropriate for the desired potato chip. There are several configurations of cookers, the most common one employing linear conveyors. In such a cooker, the slices are continuously placed in the oil at one end of the cooker and advanced under control through the cooker where potato chips are continuously withdrawn from the other end. In either batch or continuous processing, the oil may be heated, for example, by heaters directly submerged in the oil or by circulating the oil to an external heater and returning the heated oil into the cooker. It will be appreciated that other methods and means of heating may be utilized.

The following is a description, expressed in general terms, of several types of snack items which may be made utilizing the apparatus and teachings of the present invention. The following however is not exhaustive of the types of snack items which may be made in accordance with the invention since in many instances the properties of snack items are unique to the particular manufacturer. Thus, many other types of snack items may be made utilizing the apparatus and teachings of the invention, including chips referred to as "Hawaiian," kettle-cooked, kettle-fried, low-cal, "Deli-style," chocolate-coated, as well as numerous types of chips unique to geographic locales.

The following descriptions are expressed in general terms, since there is no standard definition or well-defined parameters for types of snack items. Thus, the following description is provided to apprise those utilizing the invention in general terms of some products to which the invention applies.

CONVENTIONALLY COOKED SNACK ITEMS

Conventionally cooked snack items, especially potato chips may be characterized by reference to standardized color charts, oil content, water content, number of folds, clumps, blisters, and the like. The capability of a particular type of potato to achieve desirable chip qualities is defined as its chipping quality. Usually, conventional chips have a oil content in the range of about 32-40% by weight and moisture content in the range of about 1-4% by weight. Conventional chips may be cooked either by batch or continuous processing. The most common cooking conditions for a conventional potato chip in a continuous process utilize external heating means and continuous oil circulation. The chips are immersed initially into hot oil at a temperature of about 360° to 390° F. and conveyed through the cooker such that there is a drop in temperature of the oil along the cooking path. The chips and cooking oil flow concurrently along the cooking path. The cooked chips are withdrawn from the oil at a temperature of about 320° to 350° F. There is usually a 30° to 45° drop in temperature during the course of continuous cooking of conventional potato chips. In some instances, multi-zone cookers are used wherein the temperature drops along the cooking path in one zone, then rises as the next zone is entered, resulting in a "sawtooth" temperature profile along the cooking path.

Other continuous cooking systems for conventional potato chips include various arrangements or configurations of direct fired cookers. The time-temperature profile through the cooker can be altered by modifying the cooker design but there are severe limitations imposed by the fact that the heat transfer capability is limited by the heat transfer surface available within the cooker. These types of cookers are usually larger than external heat exchanger cookers for equivalent production rates, and more importantly they contain more cooking oil than externally heated systems require to cook the same amount of food product. The oil turnover rate, meaning the time in which the equivalent volume of cooking oil contained in the system is absorbed into the chips and replaced with fresh oil, is extremely important in maintaining low free-fatty acid cooking oil. Another fact effecting cooking oil quality is the film temperature which the oil is subjected to on the heat transfer surfaces. The internally heated cookers cannot achieve both low oil volume and low oil film temperatures compared to externally heated systems.

However, particularly in the area of potato chip processing, there are types of potato chips which vary from what may be considered to be conventional chips in terms of color, texture, oil content, number of folds, salt content and lack of defects. These types of chips are recognized and preferred by some consumers. These preferences for certain variations of chips may be related to ethnic or regional habits, to fad or to consumer's desire to reduce oil intake.

HARD-BITE CHIPS

Home-style Chips

There are types of potato chips which have been recognized by the consumer as having a harder-bite than a conventional potato chip. One of these types is usually characterized by the descriptive terms "home style" chips. The "home style" chips are usually cooked in a batch process but may also be cooked in a continuous process. While precise definitions of consumer-recognized chip types are not available, the general characteristics of a "homestyle" chip are that they usually have harder bite than a conventional chip. "Home style" chips are usually sliced to standard thickness (about 0.050 in.) but sometimes are sliced to 0.060–0.070 in. or thicker. Sometimes, however, even a soft chip is designated as "home style." The potatoes may be washed to remove surface starch or cooked unwashed. The slices are cooked at a lower than conventional chip cooking temperature, at about 250°-350° F. for a longer period than the cooking time for a conventional chip. The cooked chips are normally lighter in color than conventional chips and have an average (32–40% by weight) oil content. Also, whereas conventional chips are normally cooked in vegetable-based oil, "home style" chips may be cooked in animal-based oil, which may be solid at room temperature.

Maui-style Chips

Another type of hard-bite chip which has been recognized by the consumer is the so-called "Maui-style" or "open kettle" chip. This chip is recognizable in that it has normal to heavier thickness than a conventional chip, has more color variation and is characterized by a harder bite. Usually, the chips are darker than conventional chips, but color is non-uniform. The "Maui-style" chip is processed differently than a conventional chip in that the uncooked potato slices are usually unwashed or only lightly washed prior to being immersed in the oil. For conventional chips, the uncooked slices are usually washed prior to being immersed in oil in order to remove the surface starch. Furthermore, "Maui-style" chips are usually made by batch processing, although continuous processes exist. The oil content is normal (32–40% by weight) or higher. The time-temperature profile of a batch cooking process for a "Maui-style" chip is unlike the conventional chip or low oil chip in that the oil temperature decreases during the initial portion of the cooking period, then increases during the later portion of the cooking period, thus manifesting a change in the sign of the slope of the time-temperature cooking profile. Its cooking time is longer than a normal chip, usually in the range of 7 ½ to 9 minutes. While not intending to be bound by any particular theory, it is believed that the characteristic time-temperature profile, the particular potato used and the surface starch on the slices are at least required to produce a "Maui-style" chip. Typically, to process "Maui-style" chips, the unwashed or lightly washed uncooked slices are initially immersed into the hot oil at a temperature of about 290° to 330° F. Over a period of approximately 2–4 minutes temperature of the oil drops by approximately 30°, depending on the cooker size, oil volume, batch size and surface water. After this period, the cooking will continue during which there is a gradual rise in temperature, usually of about 20° to 30° F. Partially due to the fact that a "Maui-style" chip requires a longer cooking time and also because of its unusual time-temperature cooking profile, the chips are usually made by batch processing since conventional continuous cookers produce linear, saw-tooth, or decreasing time-temperature cooking profiles which are inappropriate for cooking "Maui-style" chips.

LOW-OIL CHIPS

One of these variations of either conventionally-cooked or hard-bite chips is the low oil potato chip, which has been processed by a continuous cooking system whereby the oil temperature remains relatively constant or increases during the entire cooking period, i.e., usually at a temperature range of about 275° to 350° F. The low oil potato chips are usually cooked for about 2–3 minutes, however, the cooking time will depend upon the type of potato used, slice thickness, and the cooking temperature. The oil content of a low oil potato chip may be in the range of about 22–24% by weight or lower, compared to the usual 32–40% of a conventional chip. Thus, a low-oil potato chip as referred to herein will mean a cooked chip having a oil content in the range of about 22–24% by weight, or lower. An example of a process for cooking low-oil potato chips is disclosed in British Patent Specification 1519049.

A problem with conventional deep-fried cooking is that when the potato slices come into contact with the oil, the temperature of the oil is about 365° F. which will decrease during the stay of the slices in the cooker. On account of the high temperature of the oil, an explosive boiling takes place in the first part of the cooker, as a result the pressure resulting from the high vaporization rate of the water in the slices causes some of the cell walls to burst. These ruptured cells will at least partially fill with oil when the water contained in the slices is nearly all removed and consequently the pressure is decreased. For this reason, a conventional potato chip will contain a higher proportion of oil compared to a low-oil chip.

However, in the cooking of low oil chips, the low cooking oil temperature and particular time-temperature curve allow the water to be removed from the potato cells at a slower rate than with conventional chips, thus minimizing rupture of the cells while maintaining sufficient vapor pressure to minimize oil entry into the cells. Then surface oil is removed before the chips cool to minimize absorption of residual surface oil.

Lower Oil-content Chip

There is another kind of chip, not necessarily recognizable by color, bite or texture, which, as a result of cooking and post-cooking processing, has a lower than normal oil content, but not low enough to be characterized as low-oil. A lower oil content chip, either conventionally-cooked or hard-bite, is desirable by some consumers and in some cases is not as expensive to manufacture as a low-oil chip. The oil content of a lower oil-content chip is thus in the range of 24–32% by weight.

OBJECTS OF THE INVENTION

It would thus be desirable to provide an apparatus which is readily adaptable for continuous cooking of various types of snack items, including chips which have previously been cooked by batch processing.

It is also desirable to provide a method and apparatus for improving the quality of conventionally cooked snack items such as potato chips, whereby potatoes of lesser chipping quality may be used to produce commercially acceptable chips. For example, dark or varied colored chips are a result of presence of reducing sugars which have been converted from starch due to improper storage conditions, growth condition and the particular variety of potatoes. It is thus advantageous to provide an apparatus whereby the cooking conditions are readily varied in the cooker to adapt to the characteristics (such as, sugar content) of a particular supply of potatoes in order to produce the consistent and lighter chip color.

It is also desirable to be able to vary the oil content of the snack item. For example, low oil potato chips require a specialized process, but oil content may also be varied by the oil temperature which, in part, is governed by the time-temperature relationship. It is thus desirable to be able to readily vary the cooking oil temperature profile in a cooking apparatus, since cooking time may be readily varied.

It is therefore most desirable to provide one apparatus which may be adjusted or programmed to cook all types of snack items as well as deal with variations in the raw food item, including the sliced form in which they are cooked (sliced, shoestring, etc.).

It is therefore an object of the present invention to provide an apparatus for continuous processing of cooked food products which will provide a wide variety of time-temperature profiles.

It is another object of the present invention to provide an apparatus which provides an adjustable time-temperature cooking profile to accommodate variations in the solids content, sugar/starch content and other characteristics in raw potatoes in order to achieve a uniform and/or improved product.

It is another object of the present invention to provide a method and apparatus for use therewith, for cooking food products in at least four temperature zones wherein the first two zones are characterized by a steady decrease in temperature and the final two or more zones are characterized by an overall increase in temperature wherein the temperature rises and then drops slightly in each zone.

These and other objects of the present invention will be apparent from the following description of the preferred embodiments.

SUMMARY OF THE INVENTION

The present invention provides a method and cooking apparatus for continuous processing of food products, particularly snack food products, wherein such apparatus provides cooking zones along the cooking path in the cooking apparatus which are adjustable in temperature and which apparatus further provides a cooked food product with reduced free-fatty acid by utilizing a reduced water-content (therefore, with less hydrolysis) in the cooking medium, low exposure to atmospheric oxygen, reduced total volume of cooking medium and generally reduced cooking temperature.

The present invention generally provides a method for cooking snack foods wherein the time-temperature cooking profile may have at least one change in sign of the slope and wherein cooking conditions are performed under low oxygen-atmosphere, low water-content cooking medium, low volume cooking medium, and results in low free-fatty acid content in the cooked snack foods. Lowered cooking temperatures are also a feature of the present invention.

In a preferred embodiment, a cooking apparatus is provided wherein the food products are conveyed along a cooking path through a hot oil bath through four or more successive cooking zones. The cooking profiles in the third, fourth, and successive zones are controlled by appropriate inlets and outlets to provide at least one change in sign of the slope of the time-temperature curve within each zone. As an example, preferred cooking profiles are described hereinafter, but it will be realized that any desired profile may be accomplished having a change in sign of the slope of the time-temperature curve or a continuous temperature drop, in any of the cooking zones.

In the first zone at the beginning of the zone a preferred temperature is in the range of about 300° to 310° F. and the temperature slowly drops along the cooking path through the zone to a final preferred temperature in the range of about 245° to 255° F. with no increase occurring in the temperature along the path through the first zone. The second cooking zone is also characterized by a decrease of temperature along the cooking path through the zone with no increase in temperature along the path where the preferred beginning temperature is in the range of about 245° to 255° F. and the preferred final temperature is in the range of about 235° to 245° F. The third zone is preferably characterized by two or more sub-zones. The preferred final temperature at the end of the third zone is in the range of about 290° to 300° F. where the cooked products are withdrawn from the hot oil. Within each sub-zone there is a time-temperature cooking profile along the cooking path characterized by an initial increase in temperature followed by a decrease in temperature with a net difference between the temperature at the beginning of the sub-zone and the end of the sub-zone typically being about 10° to 40° F. The peak temperature in each of the sub-zones is preferably within about five degrees of the temperature at the end of each respective sub-zone. The first two zones plus the two or more sub-zones comprise the four or more cooking zones according to a preferred embodiment of the present invention.

In a preferred embodiment, a cooking apparatus is provided which results in a particularly low free-fatty acid (FFA) level in the cooked product, utilizing a low volume of oil. In this particular embodiment the entire cooker is contained within a sealed hood, thereby minimizing contact of atmospheric oxygen with the hot oil. Additionally, oil is recycled in a plurality of cooking zones, wherein each zone may be maintained at a higher or lower temperature from the other zones. The recycled oil is dewatered in a location exterior to the cooker by contact with a dry inert gas (such as nitrogen or carbon dioxide), which removes water from the oil by hydration of the inert gas bubbles. Removal of water from the cooking oil in this manner is an advantage since the presence of water in the oil is a major cause of FFA buildup. Lowering FFA content of the cooking oil lowers FFA content in the cooked product, thereby improving shelf life (delaying onset of rancidity), taste and digestibility.

One of the advantages of the present invention is that it efficiently deals with the problem of high-moisture oil. Cooking oils at 275° and higher can contain water. The water enters the oil from both the surface of the food product and from the water being driven out of the food product during cooking. The mechanism of water being contained in oil at a temperature above its boiling point is a result of several phenomena. As heat is transferred from the hot oil to the colder water the surface of the water mass changes state from liquid to vapor. In doing so, a large quantity of heat is required, specifically 970 BTU/pound of water at atmospheric pressure. As this change of state occurs the surface of the liquid water mass becomes enveloped by steam which is a poor conductor of heat, as compared with liquid water.

This steam blanket further reduces the heat transfer from the oil to the water mass. If, however, the oil is sufficiently agitated so as to remove the steam blanket from the water mass, or more important if the water mass is divided into smaller particles, then the heat transfer rate is greatly increased and rapid change of state from liquid water to steam occurs.

It is desired that as much of the water as possible be removed from the oil before entering the suction of a circulating oil pump, because the reduced pressure and turbulence that occur in the pump suction accelerate the process of water removal from the oil and cavitation of the pump occurs, resulting in damage to the pump. Since most pumps operate on a volumetric basis the mass flow of the oil is reduced since much of the volume being pumped is replaced by vapor. This situation has serious effects in the heat exchange system due to reduced oil flow rates and local hot spots on the heat transfer surface due to the presence of vapor instead of oil. The cavitation may at times become so severe that oil circulation ceases completely.

It is further desired that as much water as possible be removed from the recirculated cooking oil before the oil is reheated at the external heat exchanger, since this would reduce hydrolysis (resulting in FFA production) which might occur when the oil is reheated.

Also, since a minimum system oil volume is of primary importance in maintaining low free-fatty acid in the oil, systems which remove water from oil but require large volumes of cooking oil, are not practical. Therefore, the present invention provides apparatus, described in detail hereinbelow, which utilize a low volume of cooking medium (e. g., oil) while also removing water from the cooking medium to reduce FFA production.

Thus, in yet another embodiment, the present invention provides an apparatus for continuous processing of food products comprising a container adapted to accommodate hot oil, a conveying means for controlled advance of food products along a predetermined path within the container, heat exchanging means external to the container adapted for heat exchange with oil communicating with the container, means for withdrawing high-moisture oil from the container, distributing means for recirculating oil withdrawn from the container through a plurality of inlet means disposed along the path wherein the inlet means comprise means for mixing the recirculated high-moisture oil with oil in communication with the heat exchanging means, and means for proportioning the relative amounts, such as a valve, of the recirculated high-moisture oil and the oil communicating with the heat exchanging means flowing into the mixing means.

In another embodiment, there is further included a de-oiling system integrated with the cooker which somewhat de-oils the cooked product, resulting in a lower-oil content food product as described above. The de-oiler is provided by a conveyor belt within the cooker which removes the cooked product from the oil bath and, while on a second conveyor, available atmosphere generated within the enclosed cooker is exhausted through or around the cooked product to drain and de-oil the product.

BRIEF DESCRIPTION OF THE DRAWINGS

FIG. 1A is a detailed view of end chamber 102 in FIG. 1 along section line A.

FIG. 1B is a detailed view of the cooking zone at sump 93 in FIG. 1 along section line B.

FIG. 1F is a schematic block diagram showing the preferred interconnection between a cooker as shown in FIG. 1 with a de-watering apparatus as shown in FIG. 1E and heat exchangers for heating cooking oil.

FIG. 2 is a schematic illustration of another cooking apparatus according to the present invention.

FIG. 2A is a detailed view of the mixing apparatus 31A and 32B in FIG. 2.

FIG. 3 is a schematic drawing of a third apparatus according to the present invention.

FIG. 9 is a plot of another time-temperature cooking curve for cooking in a five-zone cooker.

DETAILED DESCRIPTION OF THE PREFERRED EMBODIMENT

Referring to FIG. there is shown a preferred embodiment of an apparatus according to the present invention equipped with means for varying the localized cooking oil temperature along the cooking path so that the time-temperature profile along the cooking path may be made to substantially conform to a predetermined time-temperature curve, and particularly to a time-temperature curve having at least one change in slope. The cooking apparatus shown in FIG. 1 also provides an enclosed hood to minimize contact of hot oil with atmospheric oxygen, provides for a low volume of cooking oil and a low-water content in the oil, all of which contribute to a low-FFA-content cooked product.

Figure 1:
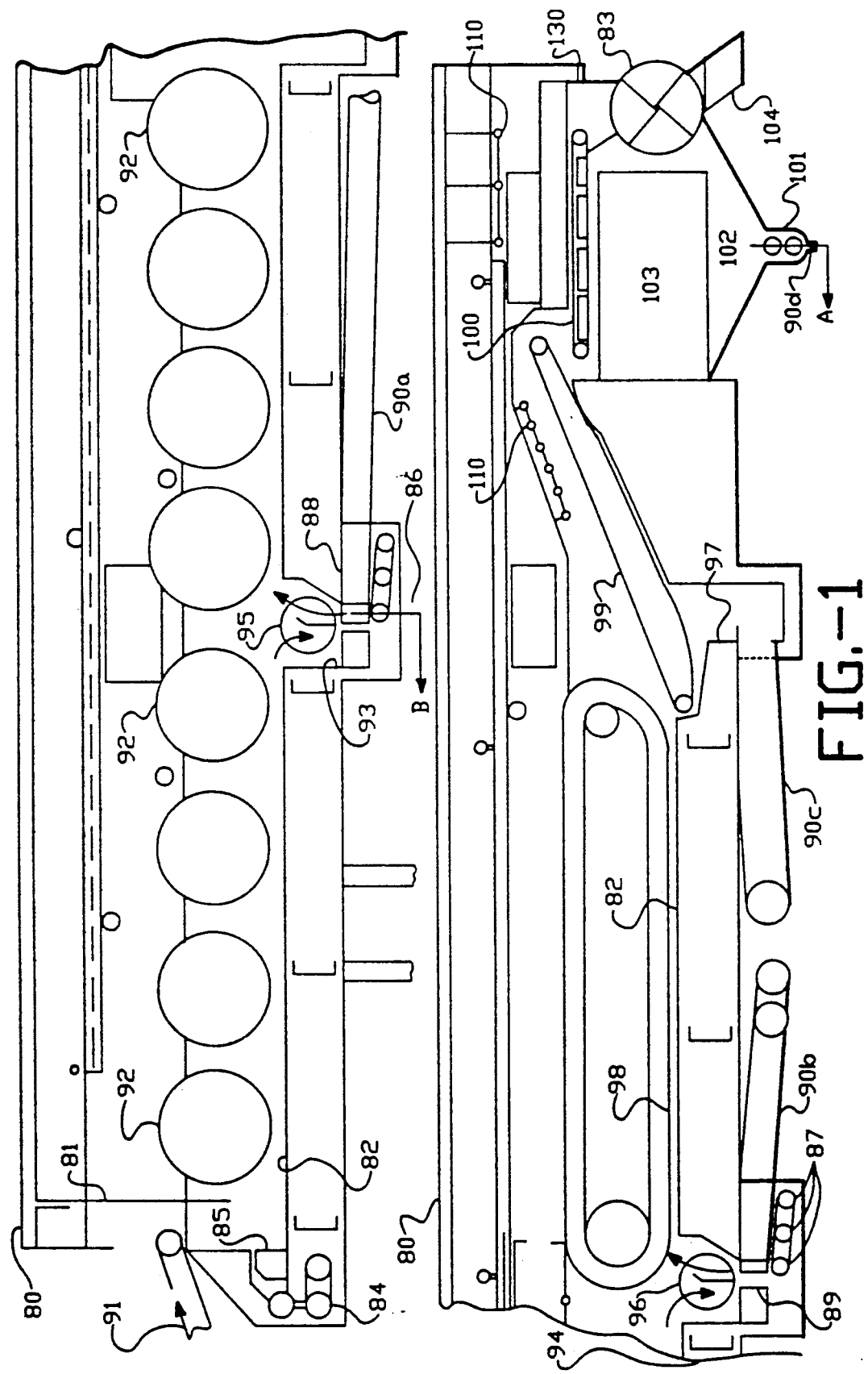
FIG. 1 is a schematic drawing of a preferred apparatus according to the present invention wherein the cooker is in a sealed hood.

The cooking medium used in the cooking apparatus shown in FIG. 1 is heated by means of one or more heat exchangers (not shown) located externally to the cooker. For example a single heat exchanger may be used to heat the entire volume of the cooking medium, a series of heat exchangers may heat the entire volume, or a plurality of circulation loops, controlled by valving, each with a separate heat exchanger may be utilized.

Referring to FIG. 1 container 82 is shown in a split side elevation. The left side of the elevation is shown in the upper portion of the figure and the right side of the elevation is shown on the lower portion of the figure. Container 82 holds the cooking oil, however, in this instance, the oil is contained within a volume substantially sealed from the atmosphere by the walls and roof of the insulated enclosure 80. Container 82 will be filled with oil so that the oil level is below the lower edge of baffle 81, but high enough so that the boil level (to which the oil rises when heated) is above the lower edge of baffle 81, thereby sealing the inner portion of the container 80 during cooking from the atmosphere at one end. At the other end where the cooked food product exits the cooker by airlock device which minimizes the exposure of the interior of enclosure 80 to the oxidizing atmosphere.

Recirculated oil from the heat exchanger (not shown) exterior to container 82 is introduced through conduits 84 which flow into a baffled inlet 85. Oil is also introduced through conduits 86 which flow through inlet 88 and through conduits 87 which flow through inlet 89. Oil is withdrawn from the container 82 through conduits 90A, B and C for heating and circulation.

The raw prepared food product, is dispensed from conveyor belt 91 and dropped into the hot oil and conveyed along the cooking zone by means of a plurality of rotating paddles 92 which dunk, separate, agitate and control the advance of the food product as it is cooked. As shown, there are two sumps 93 and 94 along the cooking path wherein oil flows from the cooking zone through exit pipes 90A and 90B, respectively, while fresh oil and/or recycled oil is introduced through inlets 88 and 89, respectively. As shown, this is done by use of self-cleaning strainers 95 and 96, which allow the exit of oil without fouling the sumps 93 and 94 with chips. By controlling the temperature of oil which enters through inlets 88 and 89, respectively, cooking zones may be established with different temperatures. For example, the chips may be cooked in one temperature range as they pass from their initial immersion in the oil near conveyor 91 to sump 93. Then a second cooking temperature range may be utilized as the chips pass from sump 93 to sump 94. A third temperature range may be utilized between sump 94 and sump 97.

After the chips pass sump 94, they will contact conveyor 98 where they are transferred through the final cooking zone in the hot oil by means of a flighted submerger-type conveyor 98 which holds the chips below the surface of the oil while controlling their advance through the cooker. The cooked chips are then removed from the cooker by means of a takeout conveyor 99 which deposits the chips onto a de-oiling conveyor 100. The de-oiling conveyor is of open-weave mesh construction and is located within a chamber 102 which contains an opening 103 to an exhaust fan. Drainage of oil from chips along conveyors 99 and 100 is enhanced by heat, which may be provided by flow of cooker exhaust gases and/or by overhead heaters 110 The cooked, de-oiled chips are then deposited into a rotary discharge airlock drum 83 and exit the cooker through chute 104.

Trough 130, when filled with oil or other liquid, forms a liquid seal from the atmosphere.

Referring to FIG. 1A, there is shown a section view through section line A of FIG. illustrating in more detail the interior of chamber 102. There is shown a fines removal auger 101 which removes fine particles from the oil prior to drainage of oil through drain 90D. The fines are removed through the upper end of auger 101 into container 105. The oil is collected in container 106 and returned for re-use in the cooker. The exhaust duct 103 is also shown as accommodating mist eliminator 107.

Still referring to FIG. 1A, there are illustrated liquid-seals for the sides of hood 80. Filling troughs 130 with oil or other liquid seals the interior of the cooker from the outside atmosphere. The troughs 130 on both sides of the hood 80 are joined as a continuous trough around at least three sides of the cooker. Interior longitudinal passages 131 are adjustable raceways for bypass of interior atmosphere around the chips on the deoiling belt 100.

Referring to FIG. 1B, there is shown a detailed view of the cooking zone at sump 93 in FIG. 1, taken along section line B. It can be seen that sump 93 is sloped downwardly toward the center of the cooking zone. At the bottom of sump 93 is the drain pipe 90A, disposed below drum 95.

Figure 1C:
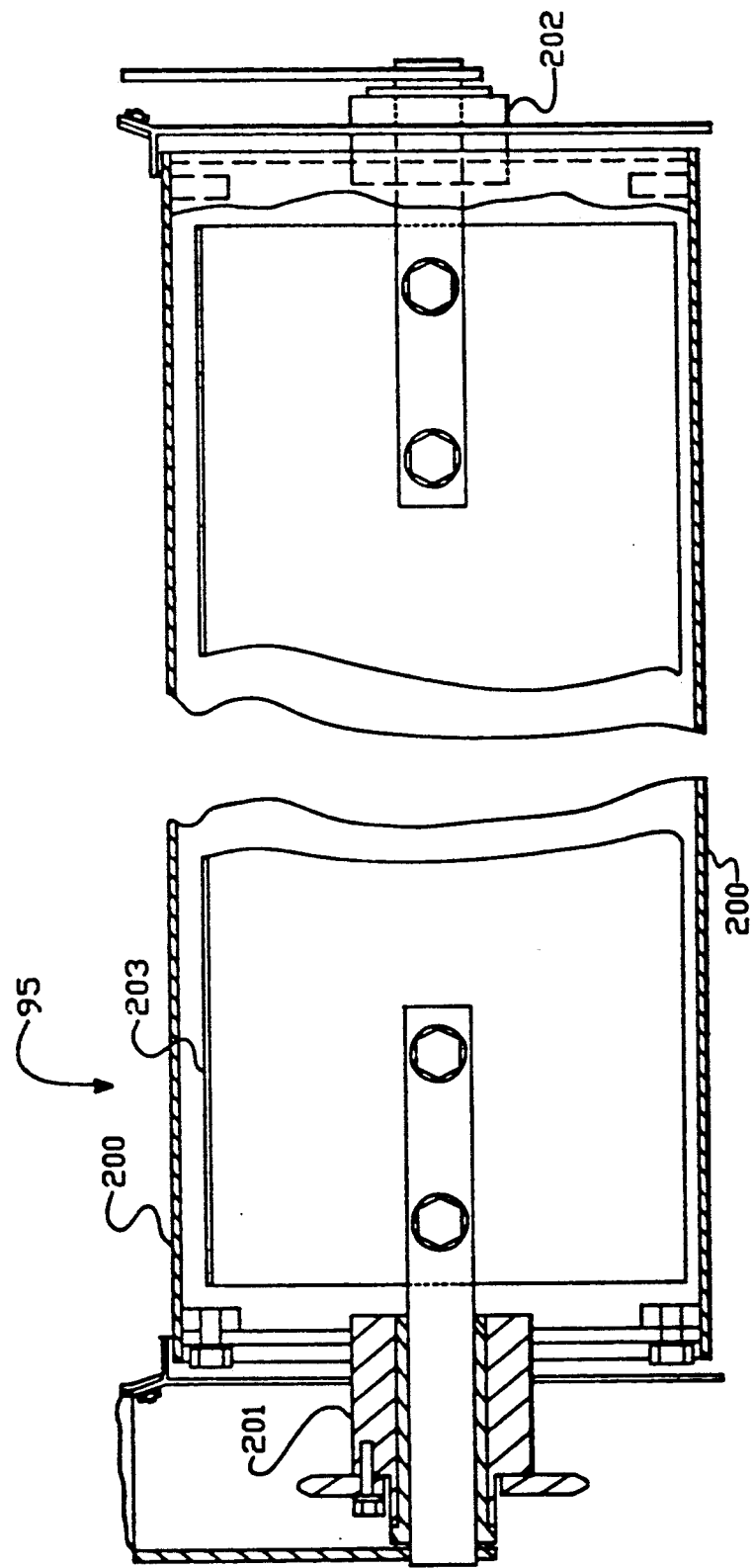
FIG. 1C is a detailed partial front elevational view of strainers 95 and 96 shown in FIG. 1.

Referring to FIG. 1C there is shown a partial front elevational view of a strainer 95 (or 96) as described in connection with FIG. 1. The strainer comprises an outer perforated shell 200 affixed to hollow rotatable shafts 201 and 202. In the interior of the drum defined by the cylindrical strainer 200 is a fixed baffle 203. The perforated strainer 200 allows oil to pass therethrough, while the baffle 203 provides a physical barrier to separate the upwardly and downwardly flowing streams of oil which pass through the strainer 200.

Figure 1E:
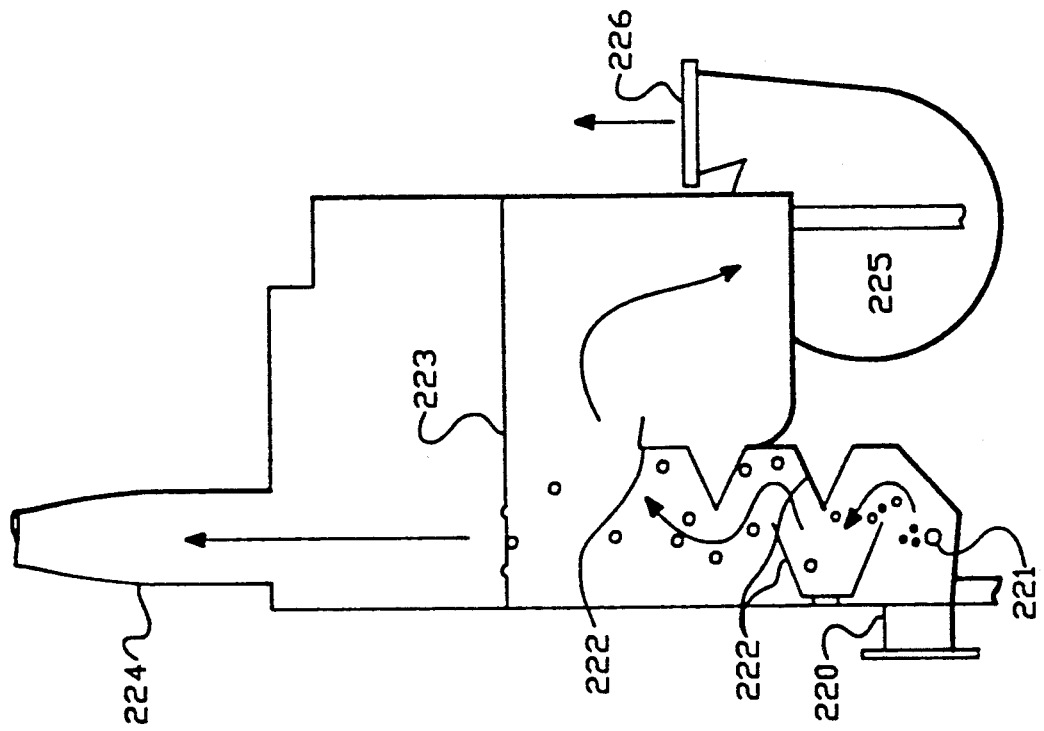
FIG. 1E is a side elevational view of a de-watering apparatus which may be used in conjunction with the cooking apparatus shown in FIG. 1.
Figure 1D:
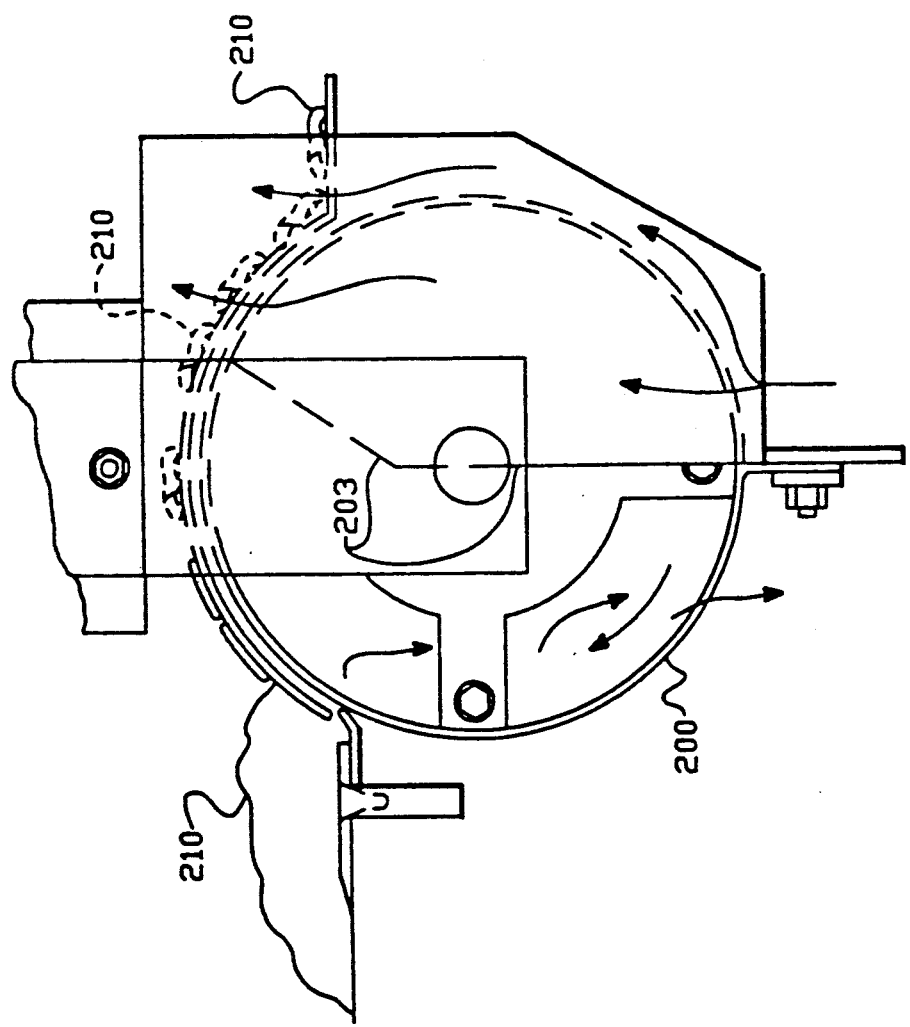
FIG. 1D is a detailed side elevational view of the strainer shown in FIG. 1C.

Referring to FIG. 1D there is shown a detailed side elevational view of the strainer 95 of FIG. 1C. As shown in FIG. 1D, the cooking food product is moving to the right and the strainer is rotating clockwise. As the cooking oil and food product come in contact with the strainer surface 200 the hot oil flows downwardly into the drain sump (not shown). The food product 210 is carried by the rotating action of strainer 200 and is transported along the cooking path. To prevent accumulation of the cooking food product at the downstream side of the strainer 200, the upward flow of incoming fresh and/or recycled cooking oil breaks up any accumulated mass of product, thereby preventing clogging and stoppage of the strainer 200. Fixed baffle 200 serves to physically divide the upwardly and downwardly flowing streams of oil. As shown, baffle 203 has an angular portion to direct the upwardly flowing oil towards the most likely points of potential accumulation of food product.

Referring to FIG. 1E which is a side elevational view of a de-watering device. The de-watering device is adapted to receive cooking oil from the cooker through inlet 220. Inlet 220 will receive oil, for example, from drain conduits 90A, 90B and 90C shown in FIG. 1. An inert gas is introduced through gas inlet 221 and the bubbles of gas are intimately mixed with the incoming oil by passage through a tortuous path defined by a plurality of baffles 222. The bubbles come to the surface 223 of the oil and exit the de-waterer through stack 224. The oil, now being substantially de-moisturized, flows out into pump 225 where it is discharged through outlet 226 for heating and recycling.

Referring to FIG. 1F there is shown a schematic diagram of the interconnection between a cooker such as shown in FIG. 1 with a de-watering apparatus such as shown in FIG. 1E and one or more heat exchangers. From cooker 230, oil is withdrawn from different zones respectively through lines 231, 232 and 233. The withdrawn oil is then introduced into de-watering apparatus 234 where it is mixed with an inert gas such as described hereinabove. Additional makeup oil may be added into the de-waterer 234 through line 235 from an oil storage source (not shown). The demoisturized oil is then passed through line 236 to heat exchanger 237. A plurality of heat exchangers may be utilized, preferably corresponding to the number of heating zones within the cooker 230. Therefore as shown in the figure, optional heat exchangers 238 and 239 may also be utilized. The reheated oil passes from heat exchanger 237 (and optionally from heat exchangers 238 and 239) through line 240 to be returned to the cooker. The oil is returned through inlets 241, 242A and 243A which, respectively, introduce heated oil into the different cooking zones within the cooker. If heat exchangers 238 and 239 are utilized then each heat exchanger may be separately utilized to introduce oil into respective inlets 241, 242B and 243B. In such case, inlets 242A and 243A are unnecessary and thus may be omitted or closed to line 240 by appropriate valves (not shown).

The cooking apparatus according to the present invention may be utilized as the continuous cooking component in a food processing system. Thus, the cooking apparatus according to the present invention may be used in conjunction with a slicer or combination of slicer and washer located upstream of the cooker. The slicer may be located upstream of the cooker whereby the sliced raw food products are conveyed by appropriate means and deposited into the entrance end of the cooker. Alternatively, the slicer may be disposed above the entrance end of the cooker whereby the slices of raw food are dropped directly into the hot oil. The slicer may be adapted with a washing apparatus which may be optionally used, to provide the versatility of cooking washed raw slices of potatoes for conventional potato chips, or unwashed raw potato slices such as "Maui-style" or country style chips. Washing apparatus is commercially available whereby a washing step may be used or omitted without changing equipment.

Referring to FIG. 2, there is shown a schematic diagram of another cooking apparatus according to the present invention. Container 10 is adapted for accommodating hot cooking oil. The raw food product is introduced into the container in the area indicated by arrow 11. As the food products are cooked, they will usually float and eventually come into contact with conveyor 12 which with oil velocity in zone A controls residence time. Conveyor 12 also transfers the chips into zone B where a plurality of rotating paddles 13 dunk, separate, agitate and control the advance of the chips. The forward velocity of the cooking oil is usually faster than the paddle speed so the paddles 13 hold the chips back to provide uniform cook time. After the chips pass through the agitated zone B they will contact a conveyor 14 which transfers them into the final zone C where they are conveyed through the hot oil by means of a flighted submerger conveyor belt 15 which holds the chips below the surface of the oil while controlling their advance through the cooker. The cooked chips are then removed from the cooker by means of take-out conveyor 15A and excess surface oil is drained at the same time from the product. It may be seen that the total cooking time is determined by the period it takes for a particular chip to traverse the length of the container 10 and the temperature profile within the container is determined by the temperature gradient, if any, along the cooking path in container 10.

Fitted inside the transfer conveyors 12 and 14 are adjustable height weirs 12A and 14A, respectively, that control the oil level in zones A and B, respectively. Since the oil entering a zone must equal the amount of oil leaving the same zone, this weir maintains zone oil level while allowing the excess oil volume to flow from zone A to zone B, and zone B to zone C. This feature allows much greater flexibility in setting the oil circulation rates in each zone to accomplish the desired temperature profile.

During the process of cooking potato chips, the initial zone within the cooker produces a high level of water in the oil as a result of raw product surface water removed from the product in the cooking process. Reaction of water with oil (hydrolysis) shortens the useful life of the oil, so water should be removed as rapidly as possible from the oil.

The apparatus shown in FIG. 2 is equipped with means for varying the localized cooking oil temperature at various points along the cooking path so that the time-temperature profile along the cooking path may be made to substantially conform to a predetermined time-temperature curve, and particularly to a time-temperature curve having at least one change in slope. A change in slope in a curve means there is at least one point in the time-temperature profile where the temperature changes from decreasing to increasing or from increasing to decreasing.

Referring again to FIG. 2, container 10 is adapted with oil discharge lines 17A, 17B and 17C. The oil which discharges through line 17A during the cooking process will contain a substantial amount of water, with somewhat less water being present in the oil discharging through line 17B. The oil discharge through line 17C will usually contain a relatively small amount of water, if any, since the cooked chips, at the end of the cooking process, contain little water. The oil through line 17C is pumped via pump 18 into heat exchanger 19 where the oil is reheated for recirculating into the container The heat exchanger 19 may be fuel-fired or heated in any other available manner. The reheated oil exiting from heat exchanger 19 through line 20 is then distributed through a network of lines 21, 22, 23 and 24 into container 10. However, before entering container 10 the recirculated hot oil in lines 22 and 23 is first mixed with high water containing oil from lines 17B and 17A, respectively. The proportioning of the mixtures of the oil from lines 22 and 17B is controlled respectively through valves 25 and 26 and the proportioning of oil from lines 23 and 17A controlled respectively through valves 27 and 28. Appropriate pumps 29 and optional filter 30 are provided. The apparatus for mixing the high water containing oil and the hot oil comprises components 31A, 31B, 32A and 32B.

The detail of 31A, 31B, 32A and 32B is shown in FIG. 2A. The high water containing oil is forced through a distribution manifold and through a plurality of jets 32A. The hot oil from the heat exchanger 19 is also forced through a distribution manifold and through a plurality of jets 32B which is larger in diameter and concentric to jet 32A. The rapid contact and intimate mixing of the high-moisture containing oil with the hot oil will cause the dispersed water droplets to vaporize and flash from the oil, thereby lowering the moisture content of the oil as it reenters tank 10. As shown, jets 32A and 32B may be disposed at an angle with respect to the oil flow within the tank 10. Alternatively, high water containing oil may be forced through jets 32B and hot heat exchanger oil may be forced through jets 32A, thereby reversing the roles of the jets.

The relative flow rates of hot oil through jet 32B and cooler oil through jet 32A will control the average temperature of the oil within the vicinity of each inlet 32B into container 10. Thus, by disposing a plurality of inlets 32B along the cooking path within container 10 the time temperature profile along the cooking path may be controlled to substantially conform to any predetermined curve. Various temperature monitoring means, such as thermocouples, may be disposed at advantageous points to monitor the temperature characteristics of the oil. Exemplary temperature monitoring units 33 are shown in FIG. 2.

FIG. 3 shows another apparatus according to the present invention. A difference is that in FIG. 3, there are two streams of oil flowing in opposite directions, both of which drain into sump 40 in the tank comprising sections 41A and 41B. The sliced raw food products are dispensed from conveyor belt 42 and dropped into the hot oil into tank 41A. Chips are conveyed through cook zone A by a combination of forward oil velocity and the speed of submerged conveyor 43. Conveyor 43 also serves to separate the chips from the oil exiting through oil outlets 46 and sump 40. This positive means of separating the chips from the oil exiting the fryer provides greater flexibility in adjusting oil rates through intermediate inlets and outlets 56A, 56B and 46 which as necessary provide the desired time-temperature curve. As the chips leave zone A, they are engaged by the initial portion of conveyor 44 which positively conveys the chips through both zone B and zone C by a plurality of suspended positioning flights 44A. Since the chips in zone B may still contain sufficient moisture that confinement in a restricted area would result in the formation of clumps of chips that are cooked together, the belt portion of conveyor 44 is kept above the oil level and only the positioning flights are used to control the chip movement. When the chips reach zone C, the conveyor belt 44 is offset downwardly to reduce the product space and then submerges the chips under the surface of the oil where cooking is completed.

Positioning flights 44A also serve as wipers to prevent build-up of starch or product fines on the tank bottom. In this application flights 44A are similar to that shown in U.S. Pat. No. 3,472,155. Flights may also be attached to belt 43 to provide similar wiping action in Zone A.

The cooked chips are conveyed onto take-out conveyor 45 and discharged from the cooker. The oil in tank 41B flows downwardly into sump 50 to the left whereas the oil in tank 41A flows downwardly into sump 40 to the right in FIG. 3 as shown. The high water containing oil in zone A is confined substantially to tank 41A and is discharged through a network of lines 46 and pumped by pump 47 for recirculating into tank 41A and 41B through lines 48 and 49. The substantially moisture-free oil from zone B and C draining into pump from tank 41B is separated from the oil in the sump 40 draining from 41A by baffle 50. This substantially moisture-free oil is withdrawn through line 51 by pump 52 into heat exchanger 53 where the oil is reheated to an appropriate temperature. The reheated oil is then recirculated into tank 41A through the network of lines 54 and into tank 41B through line 55. The hot oil in lines 54 is mixed with the high water containing oil from lines 48 and the hot oil from line 55 is mixed with high water containing oil from line 49 by the mixing apparatus 56A and 56B, shown in greater detail in FIG. 3A.

Figure 3A:
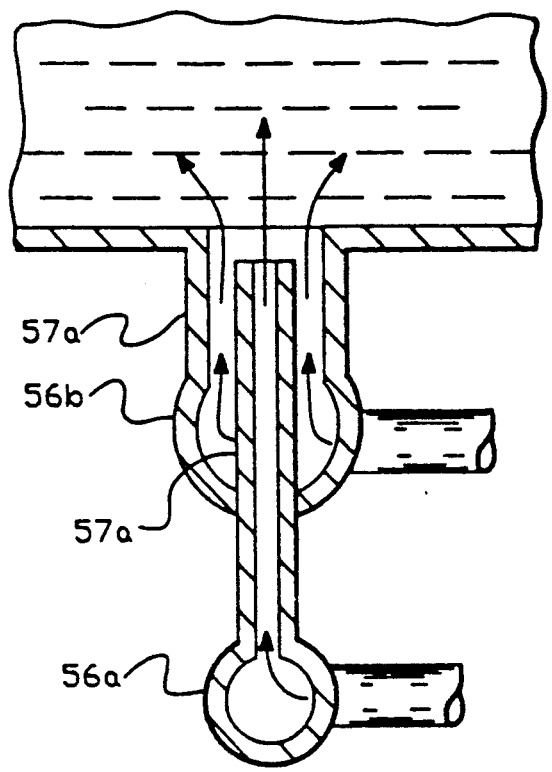
FIG. 3A is a detailed view of the mixing apparatus 56A and 57B in FIG. 3.

Referring to FIG. 3A, the hot oil from the heat exchanger is passed through a distribution manifold and through jets 57B. The high water containing cooler oil is passed through the distribution manifold and through jets 57A which are concentric with jets 57B. The rapid contact of the hot oil and the cooler high water containing oil causes intimate mixing and sudden expansion of the water droplets and flashing off the water vapor. As shown, the inlet jet 57B is orthogonal to the flow of oil within tanks 41A and 41B.

The localized temperature along sections of tank 41B may be controlled by disposing along the cooking path within tank 41B inlet jets 58 which contain reheated oil from heat exchanger 53 and which flash off moisture in oil before it reaches sump 40 and pump 52. Various temperature control means such as thermocouples, not shown, may be appropriately located along various lines and locations in the tank to control the localized temperature within each tank 41A and 41B. The relative flow of hot and cold oil through the various lines may be controlled by various valves 60.

Downstream from the cooker there may be used a defatter apparatus, such as that described in Swedish Patent 833,714 or U.S. Pat. No. 3,627,535, whereby the cooking system will make low oil potato chips.

Also located downstream from the cooker may be conventional seasoning and packaging apparatus.

Figure 4:
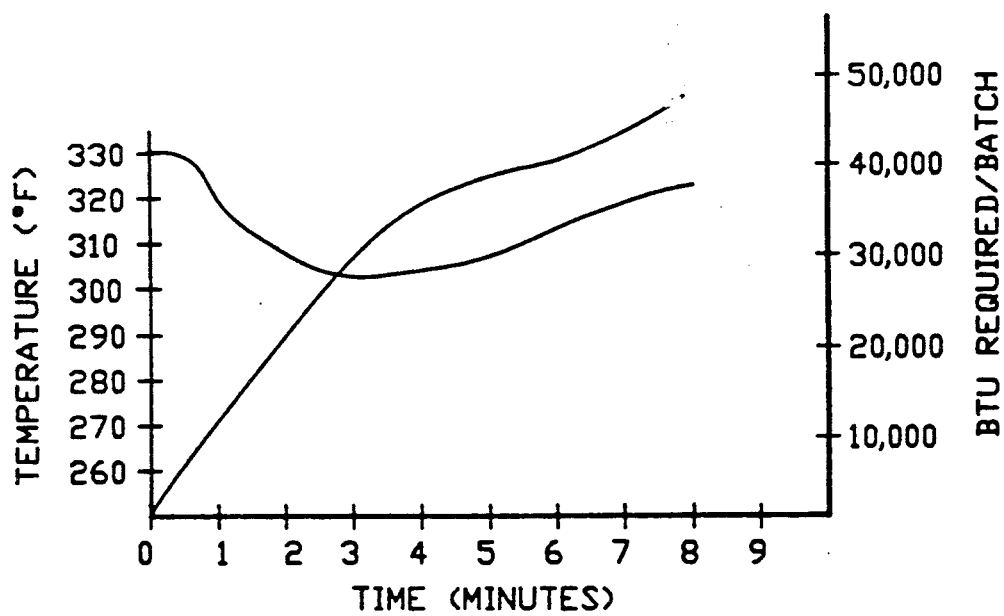
FIG. 4 is a plot of a typical time-temperature curve and time-Btu required curve for the cooking of "Maui-style" potato chips.

Referring to FIG. 4, there is shown a plot of a typical time-temperature profile and time-Btu required profile for the cooking of "Maui-style" potato chips. Although these curves were determined from a batch style cooker, these time-temperature profiles may be substantially reproduced using a continuous cooker as shown in FIGS. 2 or 3. As may be seen in FIG. 4, the time-temperature profile for cooking "Maui-style" chips shows an initial cooking temperature of about 330° F. which gradually decreases for approximately 3 to 3½ minutes to about 304° F. After 3 to 3½ minutes, the temperature then increases, and gradually increases over the next 4 ½ minutes to a final temperature of about 324° F., at which time the cooked chips are removed from the oil and the oil temperature is allowed to increase to 330° F. before the next batch is started.

Figure 5:
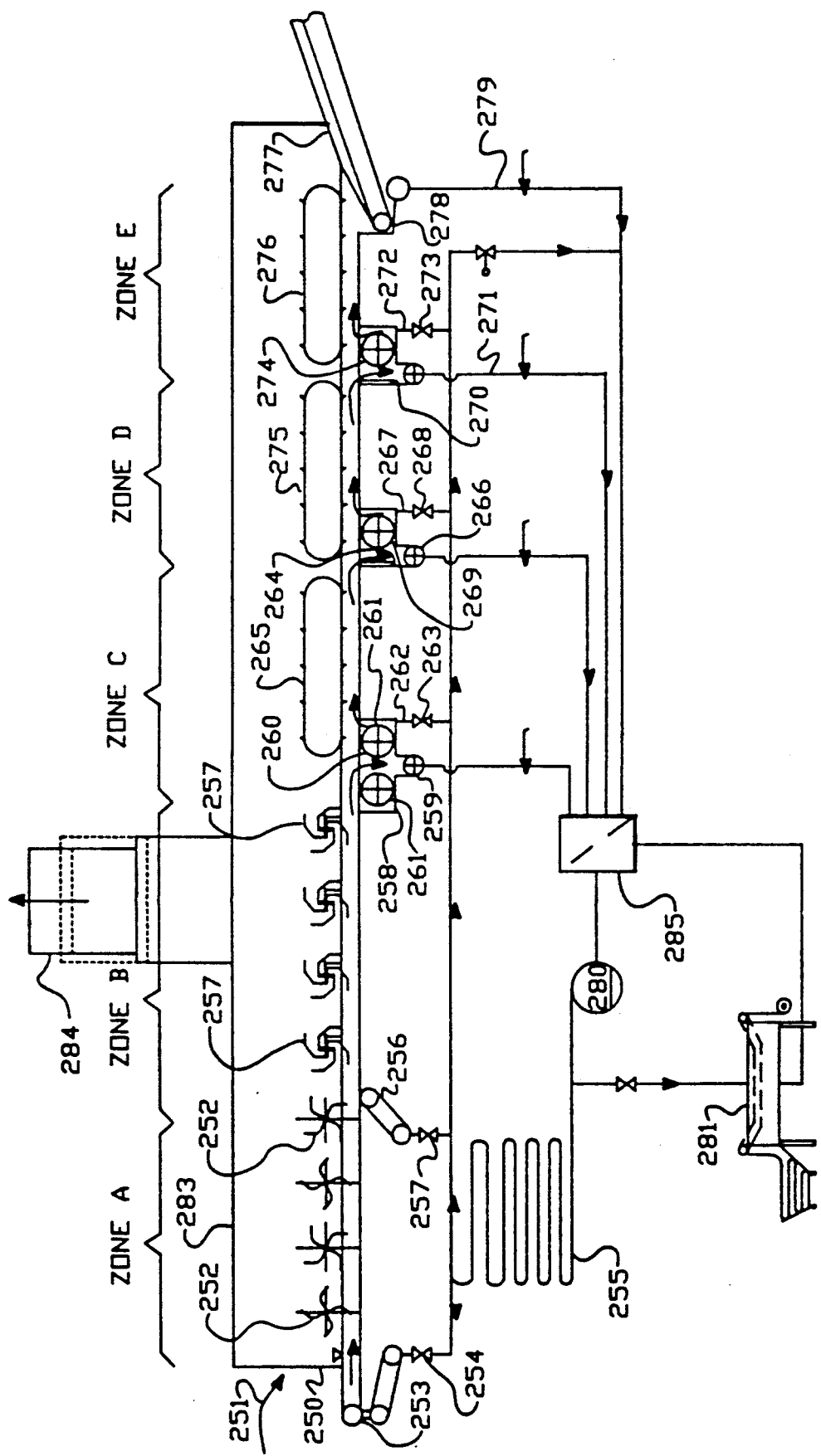
FIG. 5 is a schematic drawing of a preferred apparatus according to the present invention wherein there are five cooking zones.

Referring to FIG. 5, there is shown a schematic diagram of a preferred cooking apparatus according to the present invention which provides for five cooking zones. Container 250 is adapted for accommodating hot cooking oil. The raw or partially precooked food product is introduced into container 250 in the area indicated by arrow 251. As the food products are cooked, they travel with oil through zone A and come into contact with a rotating device such as a paddles 252 which dunks, separates, agitates and controls the advance of the food products. The rotational speed of the devices 252 is controlled to retain the food products for the appropriate time as they move through zone A. The temperature at the beginning of zone A within the oil is determined by the incoming hot oil entering through inlet 253 through which flow is controlled by valve 254. The oil entering through inlet 253 has been heated in heat exchanger 255 and is controlled to be within a temperature range, preferably for cooking hard-bite potato chips, which is about 300° to 310° F. As the hot oil entering through inlet 253 comes in contact with the food products the cooking process causes heat transfer from the oil to the food products, driving off moisture from the food products. Therefore the time-temperature profile of the cooking oil in zone A as it moves, as shown from left to right, is steadily decreasing since no new heated oil is injetted along the cooking path in zone A, the maximum temperature within zone A occurs at inlet 253 and the minimum temperature within zone A occurs just prior to inlet 256 which also marks the beginning of zone B. Hot oil may then be introduced through inlet 256 controlled via valve 257. The oil entering through inlet 256 is intended not to elevate the temperature of the oil at that point but rather to change the rate of temperature drop within zone B. Hence within zone B the temperature of the oil just following inlet 256 will be less than temperature of the oil immediately preceding inlet 256. The cooking food products are advanced through zone B by way of device 257 to rotate, control and dunk product. At the end of zone B is a sump 258 where oil can be withdrawn via outlet 259. As shown, the oil prior to being withdrawn through outlet 259 is filtered through a filtering means such as an endless mesh belt 260 continuously rotated around drums 261. Alternatively a perforated drum may be used as the filtering means such as that illustrated and described in connection with FIG. 1D above. Also located at sump 258 is oil inlet 262 controlled by valve 263. By controlling the rate of withdrawing of oil through outlet 259 and introducing of hot oil into inlet 262 it is intended that the fresh oil cause a surge such that the temperature at inlet 262 and just subsequent thereto will exhibit a rise in temperature. The rate of introducing the hot oil is such that the temperature will rise within zone C peaking prior to the end of zone C and cooking prior to sump 264. In a typical hard-bite chip cooking process the temperature near sump 258 will be approximately 245° to 255° F. with the temperature peaking within zone C at about 260 and then cooling to about 255° at sump 264. The cooked food products are driven through zone C with a flighted submerger conveyor belt 265 similar to belt 15 shown in FIG. 2 above. At sump 264 there is an outlet 266, an inlet 267 controlled by valve 268 and a perforated drum filtering mechanism 269. The perforated drum filtering mechanism 269 is similar to that described in FIG. 1D above. Inlet 267 marks the beginning of zone D in which the time-temperature profile will be similar in shape to that of the time-temperature cooking profile of zone C, i.e., there will be an initial surge in temperature peaking before the end of zone D and cooling prior to reaching sump 270. At sump 270 there is again an outlet 271, an inlet 272 controlled by valve 273 similar to that shown in connection with sump 264. There is also a drum filtering mechanism 274 similar to that shown in connection with FIG. 1D above. A flighted submerger conveyor belt 275 drives the cooked food products through zone D. In zone E the food products are driven via flighted submerger conveyor belt 276 and the withdrawal of oil through outlet 271 and introduction of hot oil through inlet 272 is controlled so that the time-temperature cooking profile is similar in shape to that of zone C and D, i.e., there is initial temperature surge peaking prior to the end of zone E and cooling by the time the end of zone E is reached. The final temperature attained at the end of zone E for cooking hard-bite chips is approximately 300° to 310° F. with the overall temperature increasing in steps from sump 258 to the end of zone E, as will be described in further detail below in connection with FIG. 6. The cooked food products are withdrawn from the oil baths via conveyor belt 277 and directed to further processing, as needed. Other features of FIG. 5 show withdrawal of oil via terminating sump 278 through outlets 279. All of the withdrawn oil from outlets 259, 266, 271 and 279 may be recirculated to heat exchanger 255 via pump 280. Some recirculated oil can be continuously filtered through filter 281 and pumped back through pump 280 to withdraw fines suspended in the oil prior to being heated in heat exchanger 255 for reintroduction into the 250. Bypass line 282 may be utilized to the proper flow characteristics through the exchanger 255. As shown the container 250 is within hood 283, for reasons discussed above in connection with hood 80 described in FIG. 1. The 283 is vented with a vent 284. The flow of oil to pump 280 is through a continuous fines removal such as a motorized catchbox 285.

Figure 6:
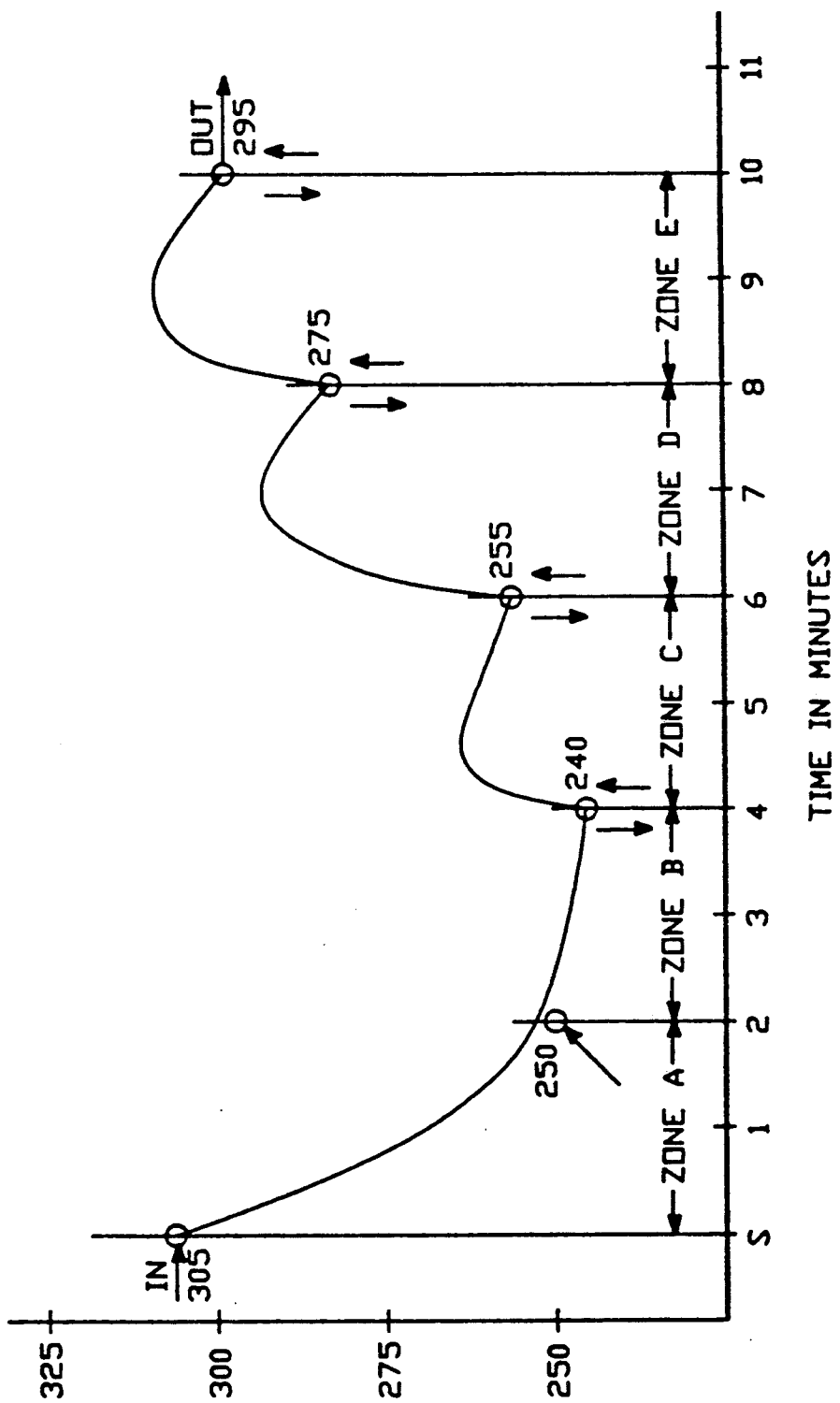
FIG. 6 is a plot of a typical time-temperature cooking curve for cooking "hard-bite" chips in a five zone cooker such as that shown in FIG. 5.

Referring to FIG. 6 there shown a plot of a typical time-temperature profile for cooking hard-bite chips in a five zone cooking apparatus such as that described in FIG. 5. As shown in the figure the food products enter the at the beginning of zone A at a temperature of 305° F. Throughout zone A the temperature steadily drops, not necessarily at a constant an end point of about 250° F. New oil is to lessen the rate of cooling, however there is no rise during zone B which begins after two minutes of cooking time. At the end of about four minutes of cooking time the cooked products enter zone C at the beginning of which there is both withdrawal and introduction of hot new oil at a beginning temperature of about 240° F. The temperature rises at the beginning of zone C, peaks before the end of zone C and then cools to a temperature at the end of zone C at about 255° F. Then oil is withdrawn and hot oil introduced such that the temperature again begins to rise at the beginning of zone D, peaking before the end of zone D and cooling to the end of zone D to a temperature at about 275° F. Oil is again withdrawn and hot oil introduced to again produce a surge in the temperature peaking before the end of zone E and cooling at the end of zone E to about 295° F. at which point the cooked food products are withdrawn. The total cooking time as shown is about ten minutes wherein the food products spend on average about two minutes in each of zones A, B, C, D and E.

Figure 7:
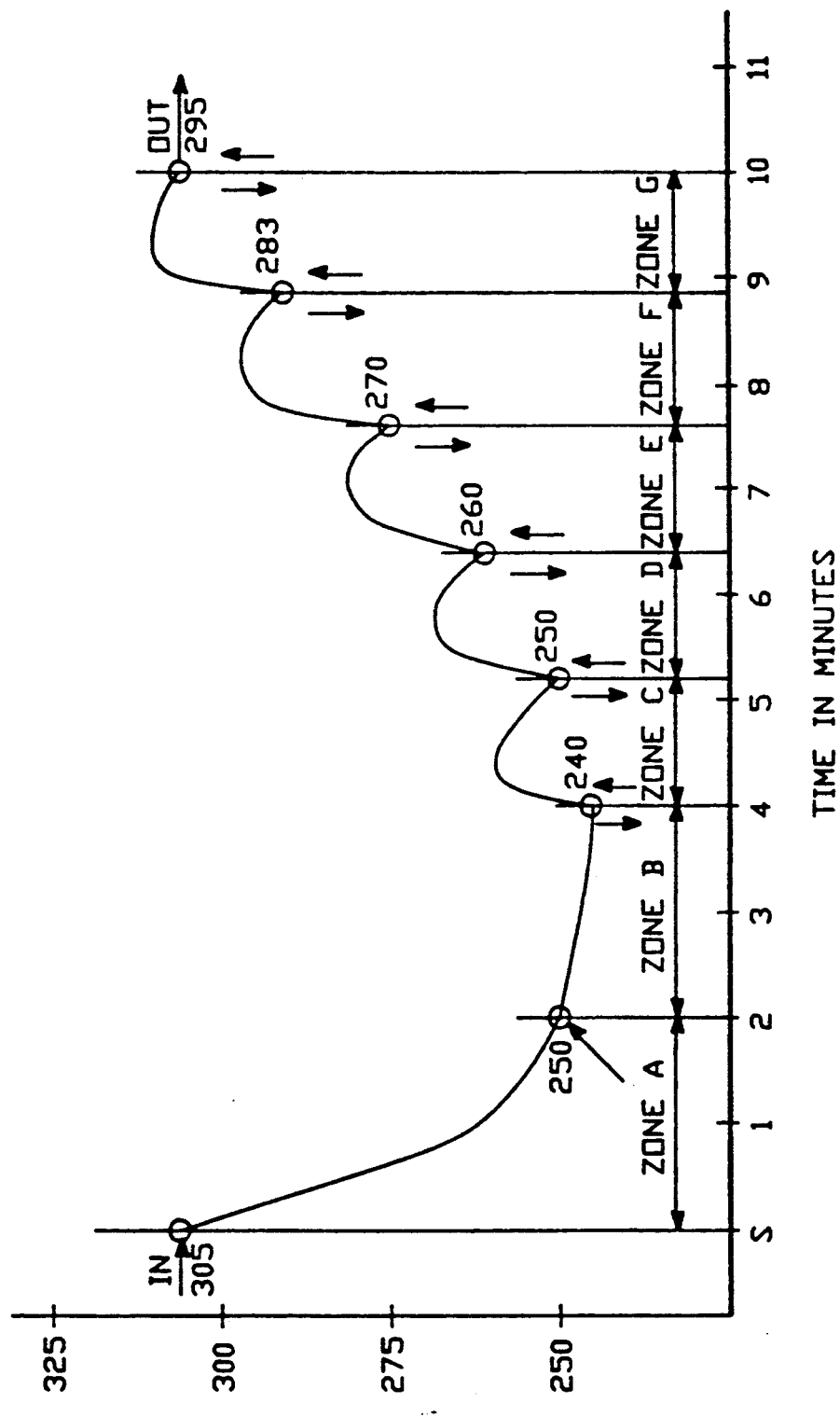
FIG. 7 is a plot of a typical time-temperature cooking curve for cooking of "hard-bite" chips in a seven zone cooker.

Referring to FIG. 7 there is shown a time-temperature profile for cooking hard-bite chips in a seven zone cooker. The first two zones A and B are identical to that of zones A and B of FIG. 6. The only difference in FIG. 7 is that the remaining about six minutes of cooking time is divided into five zones of approximately equal lengths of time rather than the two or more zones as shown in FIG. 6. Again each of the last five zones shows a similar time-temperature cooking profile of an initial increase in temperature, followed by peaking and a slight drop before reaching the end of the zone where hot oil is added to provide the desired time-temperature cooking profile for the next zone. Through each of the zones C, D, E, F and G the temperature is gradually rising with intermittent peaks with cooling prior to the end of each zone.

Figure 8:
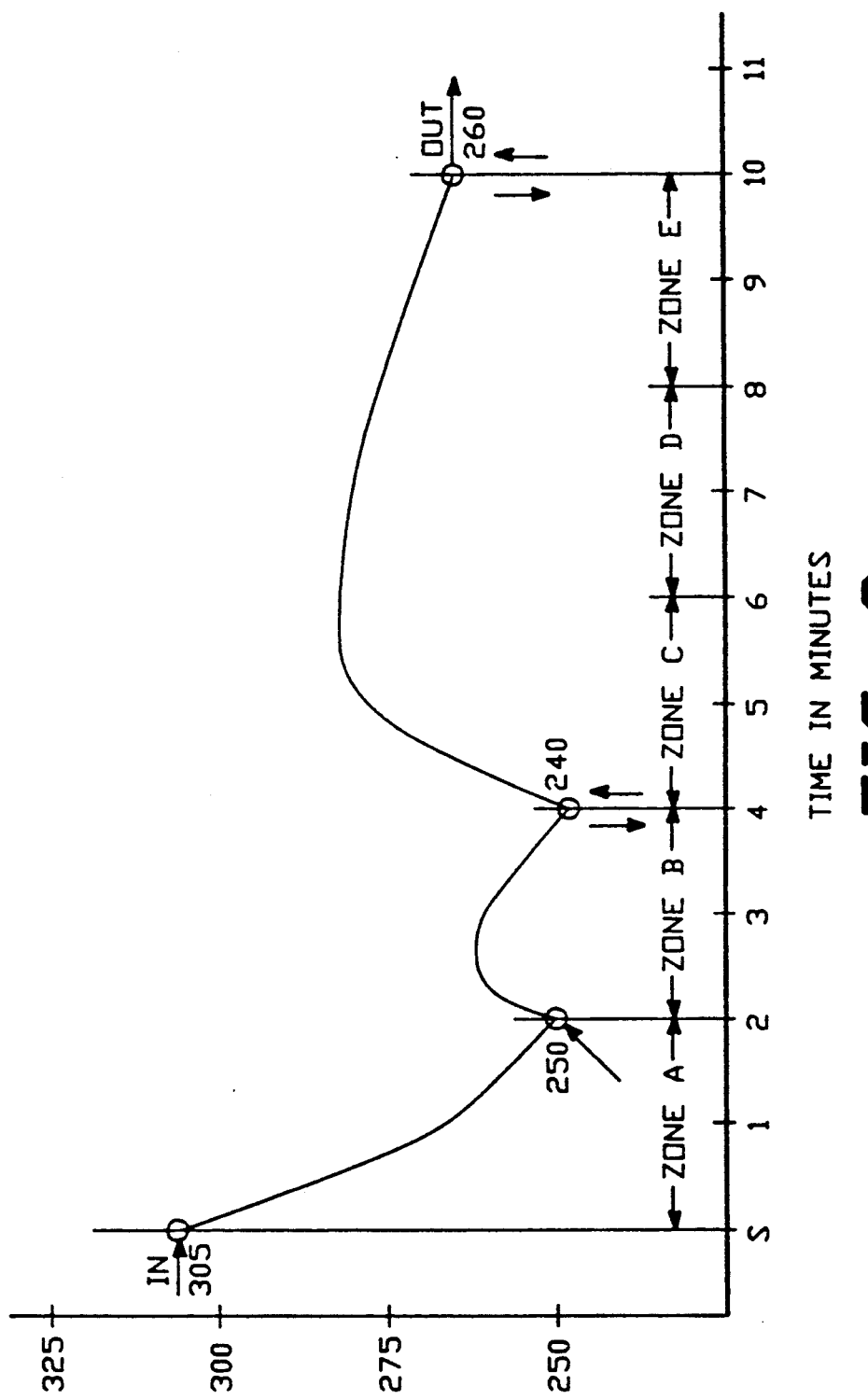
FIG. 8 is a plot of a time-temperature cooking curve for cooking in a five-zone cooker wherein there is only one temperature rise and fall during the last three zones.

Referring to FIGS. 8 and 9, there are shown other exemplary time-temperature cooking profiles which may be achieved in a five-zone cooker according to the present invention.

It will be readily apparent that various modifications may be made to be within the scope of the present invention. In particular, it may be readily appreciated by those skilled in the art from the above description that the apparatus according to the invention provide adjustability not only in time-temperature cooking profile, but also in maximum and minimum cooking temperatures. This feature of adjustability can be readily utilized to accommodate the cooking requirements of new snack foods, such as chocolate-coated chips, grain chips, vegetable snacks and so forth.

What is claimed is:

1. A process for continuous cooking of food products comprising the following steps:

providing an oil bath and a supply of oil heated at a location apart from the bath, the oil supply being introduced to the oil bath from a plurality of oil inlets and being withdrawn from the oil bath from a plurality of oil outlets thereby affording control of the oil temperatures, velocity and volume serving to establish several consecutive cooking zones among the oil inlets and outlets within the oil bath;

introducing a food product substantially continuously at one end of the oil bath and then conveying the food product in a continuous fashion through the cooking zones of the bath while controlling the advancement of the food product through the cooking zones with respect to the flow direction of cooking oil in the bath and then withdrawing the food product substantially continuously from the bath;

controlling the temperature, velocity and volume of oil flow through the oil inlets and outlets such that at a first cooking zone having at least two oil inlets, the rate of temperature drop is controlled to provide a time-temperature cooking profile characterized by a temperature drop, with no substantial increase in temperature within the first zone; and at a second cooking zone having an oil inlet and an oil outlet there is a time-temperature cooking profile characterized by an initial increase in temperature, then a decrease in temperature providing a change in sign of slope in the process time-temperature curve; and at a third cooking zone commencing at an oil outlet and ending at the food product withdrawal location of the bath there is a time-temperature cooking profile characterized by a final temperature exceeding the third zone initial temperature and approaching but not exceeding the initial temperature of the first cooking zone.

2. A process according to claim 1 wherein said temperature drop in said first zone begins at a temperature in the range of about 300° to 310° F. and ends at a temperature in the range of about 240° to 250° F.

3. A process according to claim 1 wherein said temperature drop in said second zone begins at a temperature in the range of about 260° to 255° F. and ends at a temperature in the range of about 255° to 250° F.

4. A process according to claim 1 wherein said third zone comprises three or more sub-zones in order along said bath, each sub-zone commencing and ending with a set of inlet-outlets for oil, the last sub-zone ending at an oil outlet, wherein a first sub-zone has a beginning temperature of about 250° F. and an ending temperature of about 260° F.; a second sub-zone has a beginning temperature at about 260° F. and an ending temperature at about 270° F.; and a third sub-zone has a beginning temperature at about 270° F. and an ending temperature at about 295° F.

5. A process for continuous cooking of food products comprising the following steps:

providing an oil bath and a supply of oil heated at a location apart from the bath, the oil supply being introduced to the oil bath from a plurality of oil inlets and being withdrawn from the oil bath from a plurality of oil outlets thereby affording control of the oil temperatures, velocity and volume serving to establish several consecutive cooking zones among the oil inlets and outlets within the oil bath;

introducing a food product substantially continuously at one end of the oil bath and then conveying the food product in a continuous fashion through the cooking zones of the bath while controlling the advancement of the food product through the cooking zones with respect to the flow direction of cooking oil in the bath and then withdrawing the food product substantially continuously from the bath;

controlling the temperature, velocity and volume of oil flow through the oil inlets and outlets such that at a first cooking zone having at least two oil inlets, the rate of temperature drop is controlled to provide a time-temperature cooking profile characterized by a temperature drop, with no substantial increase in temperature within the first zone; and at a second cooking zone having an oil inlet and an oil outlet there is a time-temperature cooking profile characterized by a temperature drop, with no increase in temperature in the second cooking zone; and at a third cooking zone commencing at an oil outlet and ending at the food product withdrawal location of the bath there is a time-temperature cooking profile characterized by a final temperature exceeding the initial temperature of the third zone and approaching but not exceeding the initial temperature of the first cooking zone.

6. A process according to claim 1 or 5 wherein said third zone comprises two or more sub-zones in order along said bath, each sub-zone commencing and ending with a set of inlet-outlets for oil, the last sub-zone ending at an oil outlet; and each sub-zone being characterized by a time-temperature cooking profile characterized by an initial increase in temperature, then a decrease in temperature, with the net difference in temperature in each sub-zone between the beginning and the end of the sub-zone being in a predetermined range.

7. A process according to claim 6 wherein the temperature at the end of said third zone is in the range of about 290° to 300° F.; and said predetermined range is about 5° to 20° F.

8. A process for continuous cooking of food products comprising the following steps:

providing an oil bath and a supply of oil heated at a location apart from the bath, the oil supply being introduced to the oil bath from a plurality of oil inlets and being withdrawn from the oil bath from a plurality of oil outlets thereby affording control of the oil temperatures, velocity and volume serving to establish several consecutive cooking zones among the oil inlets and outlets within the oil bath;

introducing a food product substantially continuously at one end of the oil bath and then conveying the food product in a continuous fashion through the cooking zones of the bath while controlling the advancement of the food product through the cooking zones with respect to the flow direction of cooking oil in the bath and then withdrawing the food product substantially continuously from the bath;

controlling the temperature, velocity and volume of oil flow through the oil inlets and outlets such that at a first cooking zone having two or more inlets for oil and comprising two or more sub-zones in order along said bath, each sub-zone commencing with an inlet for oil, the time-temperature profile is controlled to provide a temperature drop in the first sub-zone, then a temperature increase in the second sub-zone, then a temperature decrease in said second sub-zone, with the net difference in temperature in each sub-zone between the beginning and the end of the sub-zone being in a predetermined range; and then at a second cooking zone having an oil inlet and an oil outlet there is a time-temperature cooking profile characterized by an initial increase in temperature, then a decrease in temperature providing a change in sign of slope in the process time-temperature curve; and then at a third cooking zone commencing at an inlet-outlet set for oil and ending at the food product withdrawal location of the bath there is a time-temperature cooking profile characterized by an initial temperature exceeding the final temperature of the third zone; wherein said third zone comprises two or more sub-zones in order along said bath, each sub-zone commencing and ending with a set of inlet-outlets for oil, the last sub-zone ending at an oil outlet; and each of said sub-zones in said third zone being characterized by a time-temperature cooking profile characterized by an initial increase in temperature, then a decrease in temperature with the net difference in temperature in each sub-zone between the beginning and the end of the sub-zone being in a predetermined range.

9. A process according to claim 8 wherein the temperature drop in the first sub-zone along said bath begins at a temperature in the range of about 300° to 310° F. and ends at about 250° F., the temperature increase in said second sub-zone extends to about 280° F. and thereafter drops to about 270° F.

* * * * *

UNITED STATES PATENT AND TRADEMARK OFFICE
CERTIFICATE OF CORRECTION

PATENT NO. : 5,137,740

DATED : August 11, 1992

INVENTOR(S) : CLARK K. BENSON ET AL.

It is certified that error appears in the above-identified patent and that said Letters Patent is hereby corrected as shown below:

In Col. 9, line 56, after "110", insert a --.--.

In Col. 10, line 7, change "!30" to --30--.

In Col. 14, line 11, change "41 B" to --41B--.

In Col. 15, line 2, change "injetted" to --injected--.

In Col. 15, line 31, change "cooking" to --cooling--.

In Col. 15, line 34, change "260" to --260°--.

In Col. 16, line 9, after "is", insert --enclosed--.

In Col. 16, line 13, after "removal", insert --device--.

In Col. 16, line 19, after the first "the", insert --oil--.

UNITED STATES PATENT AND TRADEMARK OFFICE
CERTIFICATE OF CORRECTION

PATENT NO. : 5,137,740

DATED : August 11, 1992

INVENTOR(S) : Clark K. Benson, et al

It is certified that error appears in the above-identified patent and that said Letters Patent is hereby corrected as shown below:

In Col. 16, line 21, after "constant", insert —rate to —.
line 23, after "no", insert —temperature—.

Signed and Sealed this

Twenty-first Day of September, 1993

Attest:

BRUCE LEHMAN

*Attesting Officer*  *Commissioner of Patents and Trademarks*